May 23, 1967   P. PELZEL   3,320,987
EGG SHELL PIERCER
Filed Jan. 25, 1966
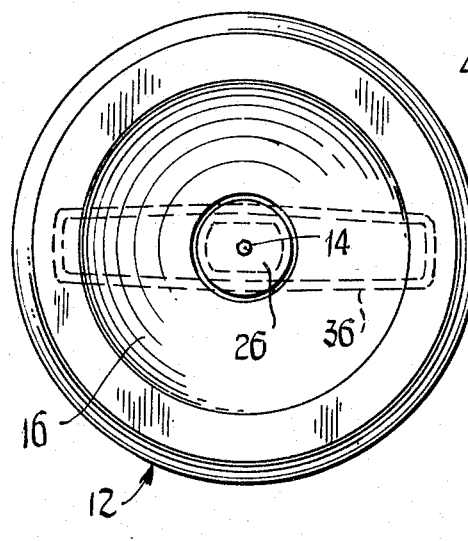
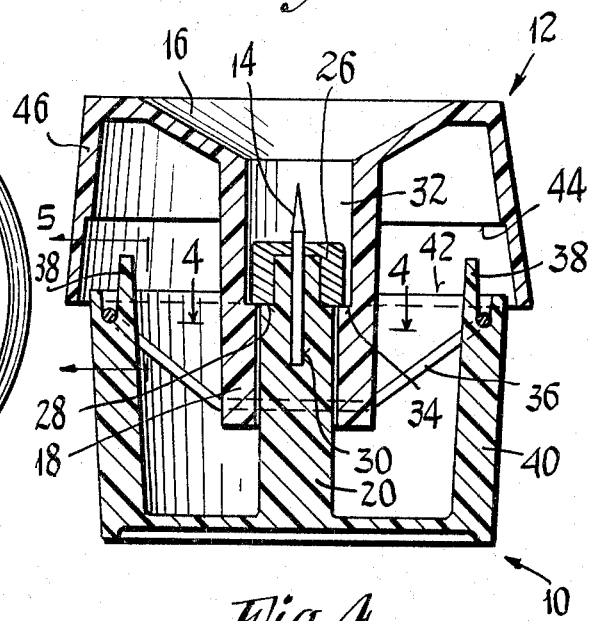
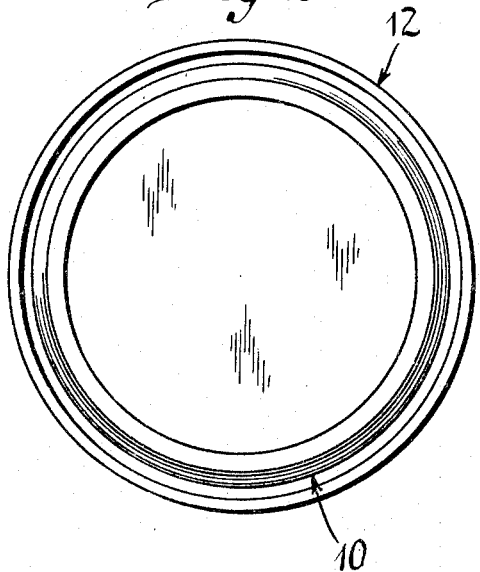
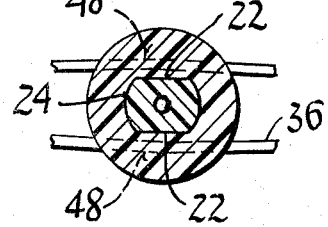
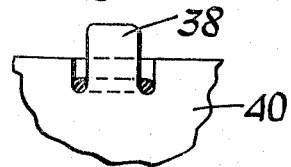
INVENTOR.
Paul Pelzel
BY
AGENT

United States Patent Office 3,320,987
Patented May 23, 1967

3,320,987
EGG SHELL PIERCER
Paul Pelzel, 74 Quarry St., Apt. 6,
Bridgeport, Conn. 06606
Filed Jan. 25, 1966, Ser. No. 522,954
7 Claims. (Cl. 146—2)

This invention relates to means for preventing the cracking of egg shells when cold eggs are immersed in boiling water, and more particularly to devices for accomplishing this, which are adapted to pierce the shell of an egg and provide a tiny hole for the purposes of venting inside air or gas.

An object of the invention is to provide a novel and improved egg shell piercing device, which is so organized as to make it especially easy and simple for a user to effectively pierce that end portion of an egg shell within which there is an air or gas pocket.

Other objects of the invention are to provide an improved egg shell piercer as above, which is in the form of a small utensil intended to rest on a table top, counter top or other supporting area; a device of this type which is especially simple and economical to fabricate whereby the manufacturing cost and the retail price may be kept at an absolute minimum; a device as above characterized, which is small, compact and yet efficient and reliable in its operation and which may be easily operated without requiring skill or understanding on the part of the user; a device which is easily and quickly assembled at the point of manufacture, attractive in appearance, wholly safe in use, and one which utilizes a simple and natural movement on the part of the user in effecting the piercing of the egg shell.

A feature of the invention resides in the provision of an improved egg shell piercer as above characterized, which may be economically molded of plastic substance, in simple low cost molds of the multiple-cavity type.

Other features and advantages will hereinafter appear.

In the drawings:

FIG. 1 is a top plan view of an egg shell piercer as provided by the invention, illustrating one embodiment thereof.

FIG. 2 is a bottom plan view of the egg shell piercer.

FIG. 3 is a vertical axial sectional view of the egg shell piercer.

FIG. 4 is a fragmentary horizontal section, taken on the line 4—4 of FIG. 1.

FIG. 5 is a fragmentary inside elevational view illustrating an anchorage member for an elastic band utilized in the device.

As shown, the improved egg shell piercer comprises a first member 10, which in the illustrated embodiment is intended to serve also as a base member; and a cooperable guide member 12 which is movably mounted on the base member 10. The said first member has a projecting upright prong 14 which is very similar to a needle point, and is intended to pierce the egg shell and leave a very small but distinct opening in the round end thereof. The guide member 12 has a concave top surface 16 which may be semi-spherical or of conical configuration, said top surface providing a hollow which is adapted for engagement by the round end of the egg, to position the same thereon.

The guide member 12 is movably mounted on the first member 10 for reciprocative movements between advanced and retracted positions, and in the illustrated embodiment this is effected by a depending hollow boss 18 which is centrally located and adapted to slidably engage a central bearing post 20 of the base 10. Preferably, as seen in FIG. 4, the post 20 has a pair of opposite flat sides 22 which engage cooperable flat surfaces of the bore 24 of the depending boss 18 to prevent relative turning movement. A slidable fit is provided, by which the post 20 and boss 18 constitute a mounting means to enable the guide member 12 to have vertical reciprocative movements without turning on the first member 10.

For the purpose of holding the guide member 12 captive, a collar 26 is press-fitted on the top of the post 20, which latter has a reduced diameter providing a shoulder 28 against which the collar 26 is brought to rest. A central opening in the collar 26 (which is shown as having the form of an inverted cup) enables the prong 14 to extend upwardly through the collar, said prong being press-fitted in a suitable bore 30 in the post 20.

The depending hollow boss 18 has an enlarged inside diameter or bore indicated at 32, in which the collar 26 is accommodated and which provides a shoulder 34 engageable with the collar to limit the upward movement of the guide member 12 to the position shown in FIG. 3.

For the purpose of biasing the guide member 12 so that it is normally retained in the uppermost position shown, the invention provides an especially inexpensive means comprising an elastic band 36 which may be of rubber, having its ends carried by lugs 38 provided in the inner wall portions of the first member 10. Said first member is shown as having the form of a cup, with cylindrical side walls 40 provided with a slight taper to facilitate the molding or fabrication. The upper edge 42 of the member 10 constitutes a stop, being engageable with an internal shoulder 44 in the guide member 12 when the latter is depressed.

As seen in FIG. 3, the guide member 12 is in the form of an inverted cup, having conically shaped side walls 46 which are adapted to extend around the upper periphery of the base member 10, thereby forming an enclosure with said base member.

The elastic band 36 extends on opposite sides of the central post 20 of the base 10, being carried in a pair of grooves 48 provided in the lower end of the boss 18. The tendency for the elastic band 36 to assume a straight or flat position maintains the guide member 12 in the raised position shown.

In piercing the egg shell prior to placing the egg in boiling water, the user merely places the round end of the egg in the hollow 16 of the guide member and then presses downward, causing the guide member 12 and the egg to move down in such a manner that the prong 14 pierces the round end and provides a small hole by which communication is established between the air or gas sack in the egg and the external atmosphere.

The extent of the puncture of the egg shell is determined by the guide member 12 in being stopped in its downward movement due to engagement between the shoulder 44 of the member and the top edge 42 of the base 10. Thus, an exact extent of entry of the prong 14 into the egg is assured at all times. The concave or hollow surface of the guide member nests the round end of the egg, and by virtue of the large contact area, prevents inadvertent breakage of the egg shell during the shell-piercing operation.

The flats 22 on the post 20 prevent relative turning between the guide member 12 and base 10, whereupon the elastic band 36 is always properly positioned and cannot be twisted or rendered inoperative.

In assembly, the elastic band 36 is first placed on the lugs 38, and thereafter the guide member 12 is applied to the base, with the elastic fitted in the grooves 48 of the boss 18. Thereafter, the stop collar 26 is press-fitted on the post 20, completing the assemblage. The prong 14 may be applied to the post 20 prior to assembly of the other parts, or it may be assembled as a last operation.

It will now be understood from the foregoing that I have provided a novel and improved, especially simple, yet effective and reliable egg shell piercer, in the form of a kitchen accessory or utensil which can rest on a counter when being used, and which is especially simple in its construction and economical to fabricate whereby the manufacturing cost and retail price are held to an absolute minimum. The device, however, is especially useful, and is most easily operated inasmuch as the user merely employs the natural movement of placing the round end of an egg in the hollow 16 and pressing downward. The shell piercing operation is effected quickly and without damage to the egg. The component parts except for the prong 14 may be economically molded of plastic substance, in multiple-cavity molds of simple design. The device is small, compact, and of attractive appearance whereby it constitutes a desirable new article of manufacture.

Variations and modifications may be made within the scope of the claims, and portions of the improvement may be used without others.

I claim:

1. An egg shell piercer comprising, in combination:
   (a) a first rigid member including a projecting prong,
   (b) a rigid guide member having a hollow adapted for engagement by the round end of an egg to position the same thereon,
   (c) means mounting the guide member on the first member for reciprocative movement thereon between advanced and retracted positions,
   (d) means acting on said first member and guide member, biasing the latter to its retracted position,
   (e) said guide member having a passage communicating with the hollow thereof and receiving the prong of the first member,
   (f) said prong extending into said hollow to pierce the round end of an egg which is positioned in the hollow when the guide member is in its advanced position, and
   (g) said prong being withdrawn from the said hollow when the guide member is in its retracted position,
   (h) said first member comprising a base having a lower portion provided with an expansive flat bottom surface by which it can rest on a support area,
   (i) said prong being upright on said first member,
   (j) said guide member comprising a rigid inverted cup disposed over and extending around the outside of the first member, and vertically movable thereon,
   (k) the retracted position of the guide member being its raised position on the first member,
   (l) said first member comprising a rigid upright cup telescoping with the inverted cup and forming therewith an enclosed inside space,
   (m) said mounting means comprising a central upstanding post on the first member and a depending hollow boss on the guide member, telescoping and slidably engaging the post, said boss and post being located in said enclosed space and being concealed by said cups,
   (n) the rim portion of said inverted cup extending around the rim portion of the upright cup for the raised position of the inverted cup whereby both the cups cooperate to present the appearance of a closed circular housing the upper portion of which is movable downward and upward with respect to the lower portion.

2. An egg shell piercer as in claim 1, wherein:
   (a) said biasing means comprises an elongate spring device having center portions connected to said boss and end portions secured to the rim portion of the upright cup,
   (b) said post and boss having cooperable means preventing relative turning movement between the members whereby the biasing means is protected against unintended deformation.

3. An egg shell piercer as in claim 1, wherein:
   (a) said biasing means comprising an elastic band engaged with the first member and guide member.

4. An egg shell piercer as in claim 3, wherein:
   (a) said first member has a pair of oppositely disposed lugs adjacent its rim portion, around which the elastic band extends,
   (b) said band engaging the boss and normally occupying an angular position wherein it continually tends to straighten.

5. An egg shell piercer as in claim 4, wherein:
   (a) said band extends on opposite sides of the post,
   (b) said boss having grooves in its bottom end, which are occupied by the elastic band.

6. An egg shell piercer as in claim 1, wherein:
   (a) said boss has a bore extending entirely through the guide member and having an enlarged diameter at the upper portion of the guide member,
   (b) a stop collar disposed in said enlarged portion of the bore of said boss and affixed to said post, to hold the guide member captive on the first member.

7. An egg shell piercer as in claim 6, wherein:
   (a) the prong of the first member is carried by the post thereof and extends through the stop collar.

References Cited by the Examiner

UNITED STATES PATENTS

| | | | |
|---|---|---|---|
| 2,224,941 | 12/1940 | Weimer | 146—2 |
| 2,676,631 | 4/1954 | Wood | 146—2 |
| 2,822,009 | 2/1958 | Haus | 146—2 |

WILLIAM FELDMAN, *Primary Examiner.*

G. WIEDENFELD, *Assistant Examiner.*